United States Patent
Elsner et al.

(10) Patent No.: US 10,938,845 B2
(45) Date of Patent: Mar. 2, 2021

(54) DETECTION OF USER BEHAVIOR DEVIATION FROM DEFINED USER GROUPS

(71) Applicant: International Business Machines Corporation, Armonk, NY (US)

(72) Inventors: Matthew Elsner, Dunwoody, GA (US); Jian Lin, Alpharetta, GA (US); Ronald Williams, Austin, TX (US); Ilgen Banu Yuceer, London (GB)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 15/975,799

(22) Filed: May 10, 2018

(65) Prior Publication Data

US 2019/0349391 A1 Nov. 14, 2019

(51) Int. Cl.
*H04L 29/06* (2006.01)
*G06K 9/62* (2006.01)
*H04L 29/08* (2006.01)
*G06N 20/00* (2019.01)

(52) U.S. Cl.
CPC ........ *H04L 63/1425* (2013.01); *G06K 9/6215* (2013.01); *G06K 9/6218* (2013.01); *G06K 9/6256* (2013.01); *H04L 63/1416* (2013.01); *H04L 63/20* (2013.01); *H04L 67/22* (2013.01); *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 9,106,687 B1 | 8/2015 | Sawhney et al. | |
| 9,600,659 B1* | 3/2017 | Bird | G06F 21/50 |
| 2006/0277184 A1 | 12/2006 | Faitelson et al. | |
| 2009/0018983 A1* | 1/2009 | El-Rafei | G06F 11/0715 |
| | | | 706/12 |
| 2009/0292743 A1* | 11/2009 | Bigus | G06F 21/316 |
| 2010/0161830 A1* | 6/2010 | Noy | H04L 63/104 |
| | | | 709/234 |
| 2011/0071972 A1* | 3/2011 | Zmolek | G06Q 10/10 |
| | | | 706/47 |

(Continued)

*Primary Examiner* — Malcolm Cribbs
(74) *Attorney, Agent, or Firm* — Jeffrey S. LaBaw; David H. Judson

(57) ABSTRACT

A machine learning-based technique for user behavior analysis that detects when users deviate from expected behavior. In this approach, a set of user groups are provided, preferably based on information provided from a user registry. A set of training data for each of the set of user groups is then obtained, preferably by collecting security events generated for a collection of the users over a given time period (e.g., a last thirty (30) days). A machine learning system is then trained using the set of training data to produce a model that includes a set of clusters in user behavior model, wherein a cluster is a learned user group that corresponds to a defined user group. Once the model is built, it is used to identify users that deviate from their expected group behavior. In particular, the system compares a current behavior of a user against the model and flags anomalous behavior. The user behavior analysis may be implemented in a security platform, such as a SIEM.

18 Claims, 5 Drawing Sheets

(56) References Cited

U.S. PATENT DOCUMENTS

| | | | |
|---|---|---|---|
| 2012/0304288 A1* | 11/2012 | Wright | G06F 21/552 |
| | | | 726/22 |
| 2014/0074796 A1* | 3/2014 | Akoglu | H04L 63/1425 |
| | | | 707/687 |
| 2014/0165207 A1* | 6/2014 | Engel | H04L 63/1425 |
| | | | 726/25 |
| 2015/0067845 A1* | 3/2015 | Chari | G06F 21/50 |
| | | | 726/23 |
| 2015/0222667 A1* | 8/2015 | Nayshtut | G06N 5/025 |
| | | | 726/1 |
| 2017/0053208 A1* | 2/2017 | Krishnamurthy | G06N 5/022 |
| 2017/0061322 A1 | 3/2017 | Chari et al. | |
| 2017/0279829 A1* | 9/2017 | Vasseur | H04L 41/0893 |
| 2017/0295189 A1* | 10/2017 | Adir | G06F 16/285 |
| 2017/0315855 A1* | 11/2017 | Doblander | G06F 11/0754 |
| 2018/0020015 A1* | 1/2018 | Munro | G06F 21/552 |
| 2018/0198812 A1* | 7/2018 | Christodorescu | H04L 63/1425 |
| 2018/0359270 A1* | 12/2018 | Chari | H04L 63/1425 |
| 2019/0294933 A1* | 9/2019 | Gupta | G06K 9/6218 |

\* cited by examiner

DETECTION OF USER BEHAVIOR DEVIATION FROM DEFINED USER GROUPS

BACKGROUND

Technical Field

This disclosure relates generally to techniques to detect anomalous or malicious user behavior in an enterprise network.

Background of the Related Art

Enterprise security is a complex problem requiring the coordination across security policies, controls, threat models and threat detection scenarios (use cases). The implementation of these policies, models and controls requires extensive use of threat monitoring technologies and security devices, as well as human resources that have security, business and technical skills. In particular, the ever increasing number of threats at scale requires automation in support of security analysts, who are responsible for preventing, detecting and responding to these threats. In most cases, the analyst must manually search through a wide range of data sources (some private, many public), review past threat events and how they were handled, check for duplicate events, currently open similar events and a knowledge database, etc., to determine an appropriate response procedure to handle this information. This process of data collection, analysis, and determining the final disposition of the alert, is time consuming and tedious for an analyst.

There are a variety of tools that exist for threat monitoring to analyze a wide range of data sources to identify patterns that are indicative of threats, security policy and control anomalies. When these threats and/or anomalies are detected, actionable alerts are created. One such tool is IBM® QRadar® User Behavior Analytics (UBA), which analyzes user activity to detect malicious insiders and determine if a user's credentials have been compromised. One application of such a system is to detect user behavior deviation from a user group, e.g., as defined in a user registry. A user registry associates each user with multiple attributes, e.g., in a Lightweight Directory Access Protocol (LDAP) application, users have attributes such as job title, department, and so forth. In this approach, users that have the same attributes are considered to be in the same group. The user behavior analytics system detects if a user's online behavior deviates from the defined group. For example, a deviation occurs if a person in the marketing department acts more like a person in an engineering department.

A UBA system of this type adds user context to network, log, vulnerability and threat data to more quickly and accurately detect attacks. Using this tool, security analysts can easily see risky users, view their anomalous activities and drill down into the underlying log and flow data that contributed to a user's risk score.

While these systems provide significant advantages, there remains a need to provide more fine-grained approaches to detect user behavior deviation.

BRIEF SUMMARY

This disclosure provides a machine learning-based technique for user behavior analysis that detects when users deviate from expected behavior. In this approach, a set of user groups are provided, preferably based on information provided from a user registry. A set of training data for each of the set of user groups is then obtained, preferably by collecting security events generated for a collection of the users over a given time period (e.g., a last thirty (30) days). A machine learning system is then trained using the set of training data to produce a model that includes a set of clusters in a model of user behavior, wherein a cluster is a learned user group that corresponds to a defined user group. Once the model is built, it is then used to identify users of a user group that deviate from their expected behavior for the group. In particular, the system compares a current behavior of a user against the model and flags the user if the user's behavior is outside what is expected.

In one implementation, the user behavior analysis is carried out in association with a Security Information and Event Management (SIEM) system In operation, the system takes input from a data server that logs user activities, performs data analytics using the machine learning, and then outputs user behavior deviation to a user interface to be consumed for example by an end user (e.g., a security administrator). In this approach, the machine learning is used to obtain statistics for normal group behaviors, and to alert deviations from normal group behaviors.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
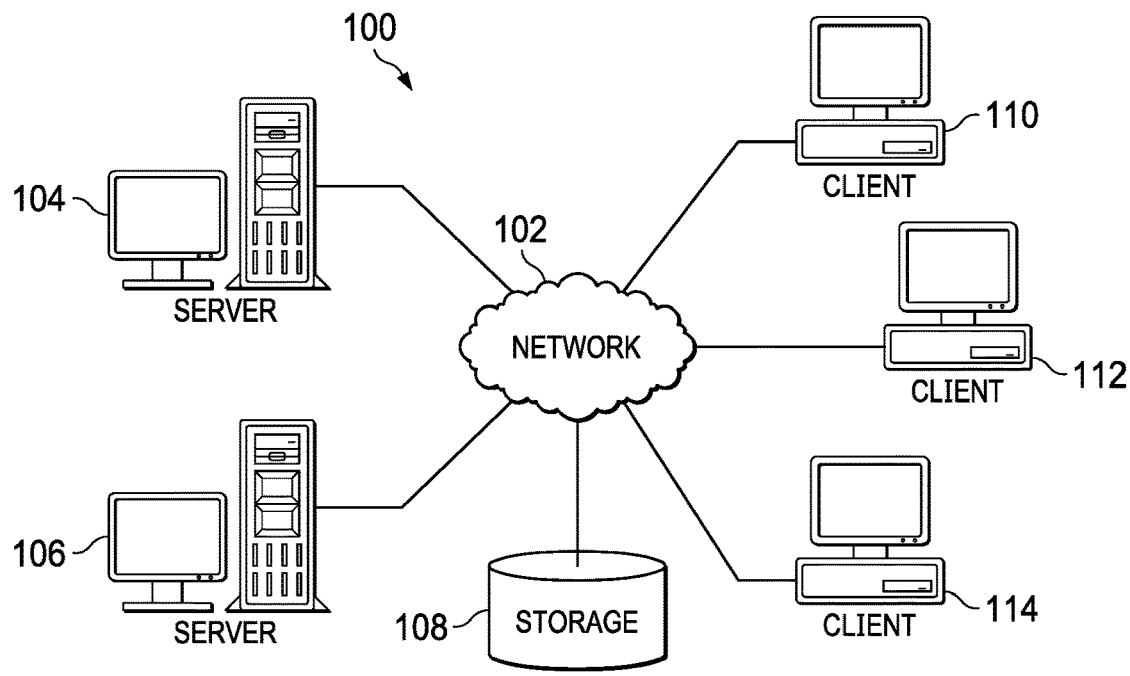
FIG. 1 depicts an exemplary block diagram of a distributed data processing environment in which exemplary aspects of the illustrative embodiments may be implemented.
Figure 2:
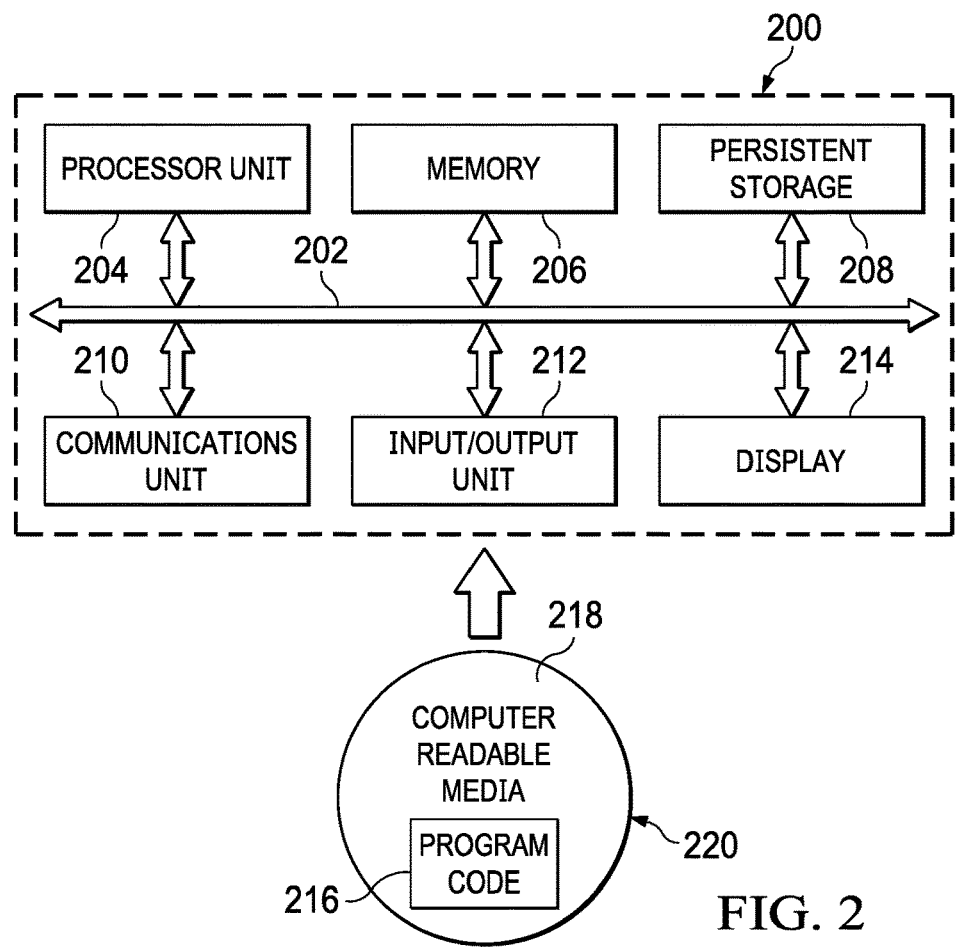
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
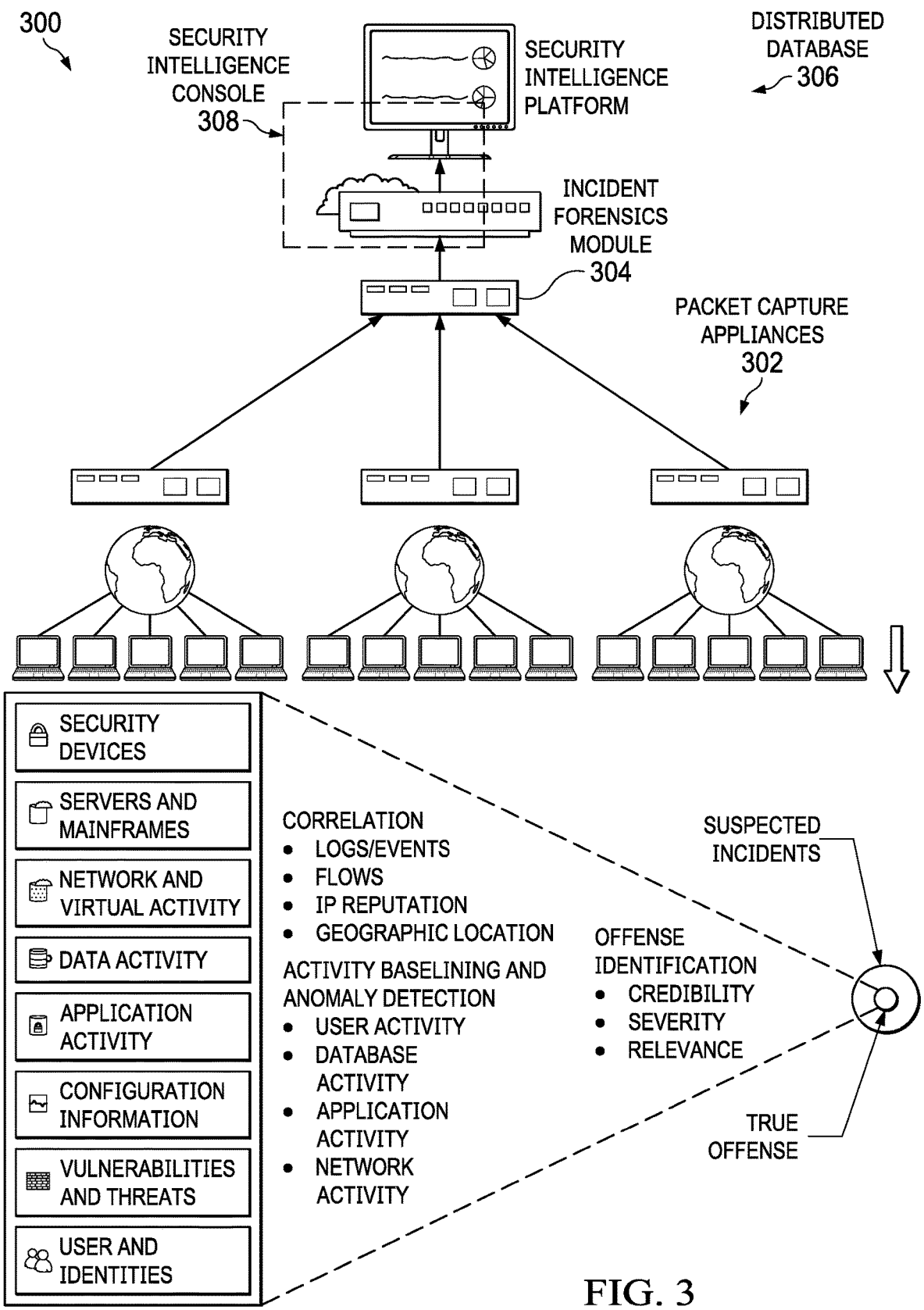
FIG. 3 illustrates a security intelligence platform in which the techniques of this disclosure may be practiced.

A known type of security intelligence platform is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar SIEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Figure 4:
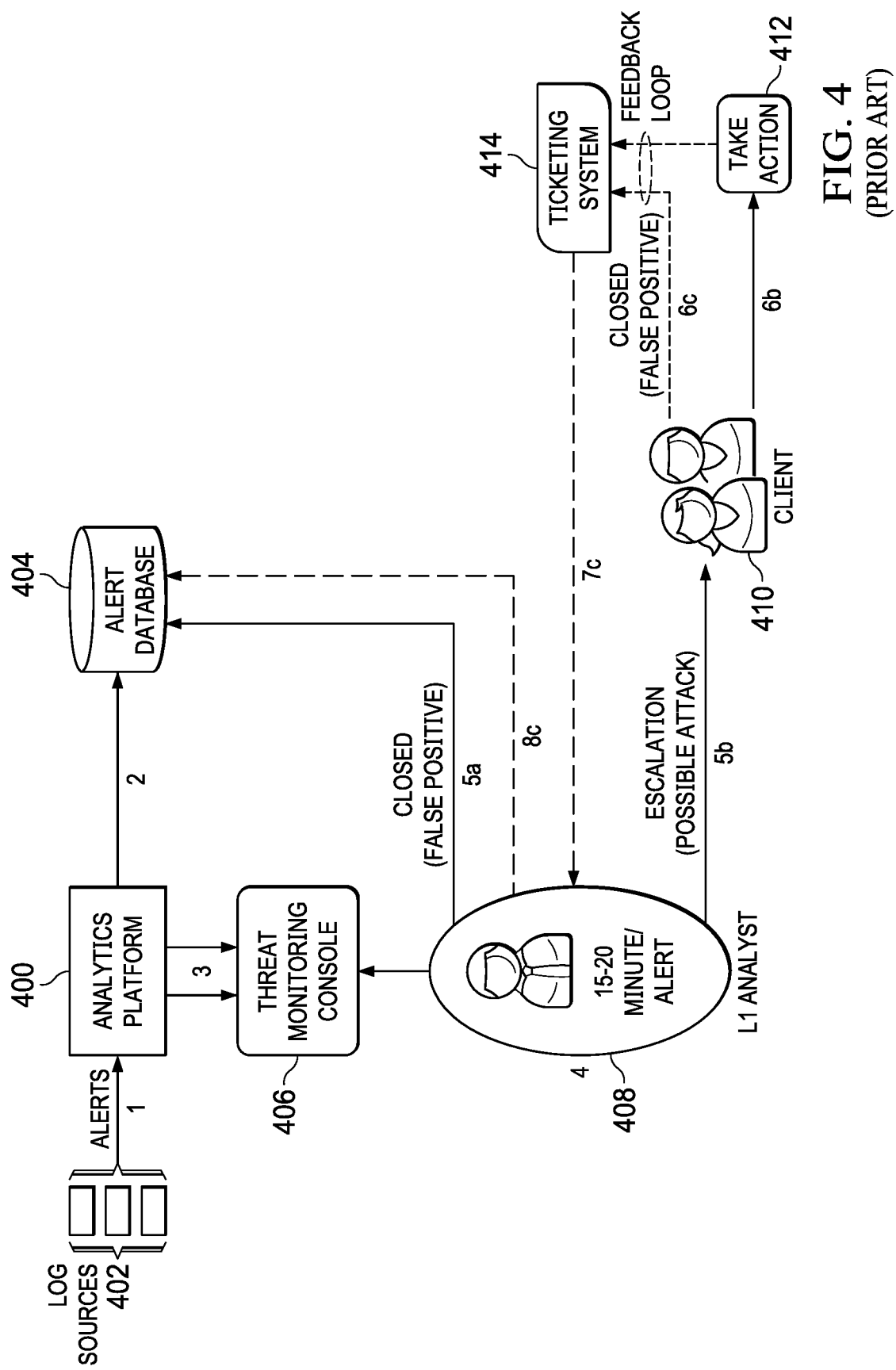
FIG. 4 depicts a Level 1 security threat monitoring operation in a data center operating environment according to known techniques.

FIG. 4 depicts a Security Operation Center (SOC) that provides Level 1 security threat monitoring using an analytics platform 400 such as IBM QRadar. The platform 400 receives alerts (at step (1)) from a variety of log sources 402, such as firewalls, intrusion detection and prevention systems, antivirus systems, web proxies, and other systems and network devices. At step (2), the alerts are stored in an alert database 404. At step (3), the alerts are provided to a threat monitoring console 406 that is manned by a security analyst 408. As is well-known, a SOC typically is manned by different levels of security analysts. A Level 1 (L1) analyst 408 is responsible for monitoring reported security events, and for closing or escalating those events according to SOC rules, policies and procedures. The security analyst 408 typically interacts with a client 410, which is the enterprise entity having an application that is being monitored for security threats. Although not shown, typically the SOC has one or more additional levels of security analysts, such Level 2 (L2) and Level 3 (L3) analysts. Typically, L2 security analysts handle escalations from L1 analysts and perform other administration and management functions, such as monitoring the performance of the L1 analysts to ensure that security events are handled timely, mentoring, and the like. Level 3 analysts handle further escalations (from L2 analysts), and provide additional higher-level administration and management functions in the SOC. Of course, the number of levels and the various tasks associated with each level may be varied and implementation-specific.

As depicted, the L1 analyst makes a finding regarding an alert, typically with a goal of making this finding within about 15-20 minutes after receiving the alert. Typically, the finding closes the alert (step 5(a)) as a false positive, or escalation the alert (step 5(b)) as a possible attack. The false positive finding is stored in the alert database 404. The attack finding typically is reported to the client 410 whose application is affected. Depending on the implementation (e.g., the SOC policy, the client procedure, etc.), some remediation or other action (step 6(b)) is taken; alternatively, the client 410 may indicate that indeed the alert is a false positive and thus should be closed (step 6(c)). The responsive action 412 may be carried out in an automated manner (e.g., programmatically), manually, or by a combination of automation and manual operations. The action may be carried out by SOC personnel, by the client, or by a combination of SOC personnel and the client. As also depicted, information regarding the response to the alert is also provided to a ticketing system 414, and such information may then be reported back to the security analyst (step 7(c)). The security analyst may then update the alert database (at step 8(c)) with the information about how the alert was handled (or otherwise closed). Thus, the alert and its associated handling information is stored in the alert database 404 and available as a data source going forward.

By way of additional background, the enterprise typically includes an identity management system by which the Company can define and manage organizational role and access entitlement to resources. Role assignment includes assigning a user to one or more business roles in the organization. Organizational roles are used to group people according to their function in the organization. Thus, for example, all Company employees are granted the employee role in the organization. Typically, a user may be assigned to one or more organizational roles in a Company, such as, for example, site manager, project manager, HR manager, and the like, as well as ancillary employee roles such as university liaison or community coordinator. Assignment of a user to an organizational role enables role-based provisioning of access entitlements to managed resources. For example, services in an identity manager represent different types of managed resources, such as Oracle® databases, Windows® machines, and the like. An organizational role may be linked to services by means of provisioning policies, entitling persons in the organizational role to an account on the managed resource that is linked to that service.

The enterprise typically includes a directory service that hosts each directory in the organization. Each such directory typically stores information about a particular application and the user(s) or group(s) of users that have entitlements to use that application, or an application instance. A representative directory is accessible via the Lightweight Directory Access Protocol (LDAP), which is a directory service protocol that runs on top of the TCP/IP stack. LDAP provides a client-server based mechanism that can be used to connect to, search, and modify network-accessible directories. Using LDAP, a directory client can query the directory application and obtain user/group data.

Detection of User Behavior Deviation from Defined User Groups

Figure 5:
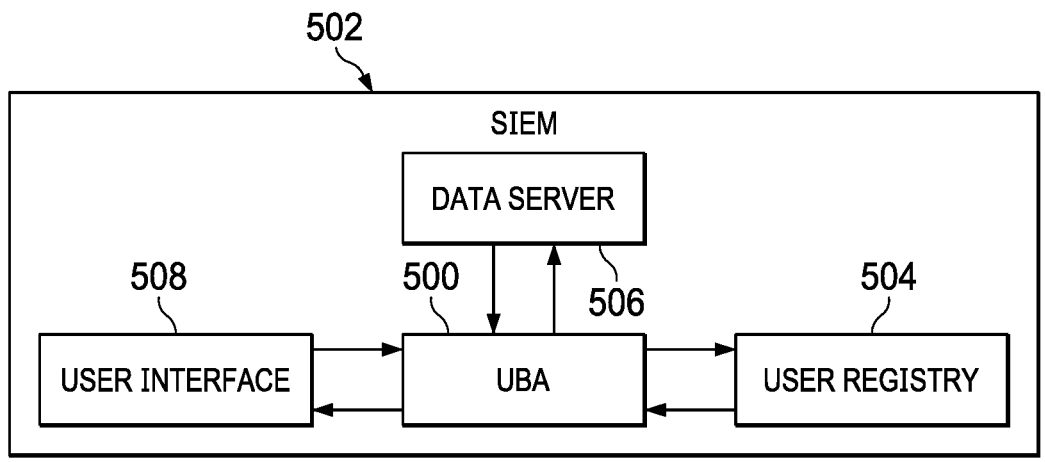
FIG. 5 depicts a Security Information Event Management (SIEM) platform that includes a User Behavior Analytics (UBA) function in which the technique of this disclosure may be implemented.

With the above as background, the following describes a user behavior analysis and modeling technique according to this disclosure. As will be described, the technique herein preferably leverages unsupervised machine learning to build a classification model that is then used to detect user behavior anomalies. Preferably, behavioral anomalies are flagged, e.g., by issuing an alert in a user interface, although the analytics system may also interact with (and drive) other mitigation and remediation processing (perhaps dependent on a security policy). In a typical implementation, and as depicted in FIG. 5, the technique herein is implemented in a UBA application 500 that executes in or in association with at SIEM 502. The application may be implemented as a set of computer program instructions executed by one or more hardware processors, e.g., in a data processing system such as depicted in FIG. 2 and described above.

As will be described, the UBA application 500 implements a machine learning (ML) system that detects user behavior deviation from one or more user groups defined in a user registry 504. In particular, the application 500 takes input from a data server 506 that logs user activities, performs data analytics, and output user behavior deviation alerts to a user interface 508, where they are consumed by an end user (e.g., a security analyst). As will be described, unsupervised machine learning is used to obtain statistics for normal group behaviors, and to alert deviations from normal group behaviors.

Figure 6:
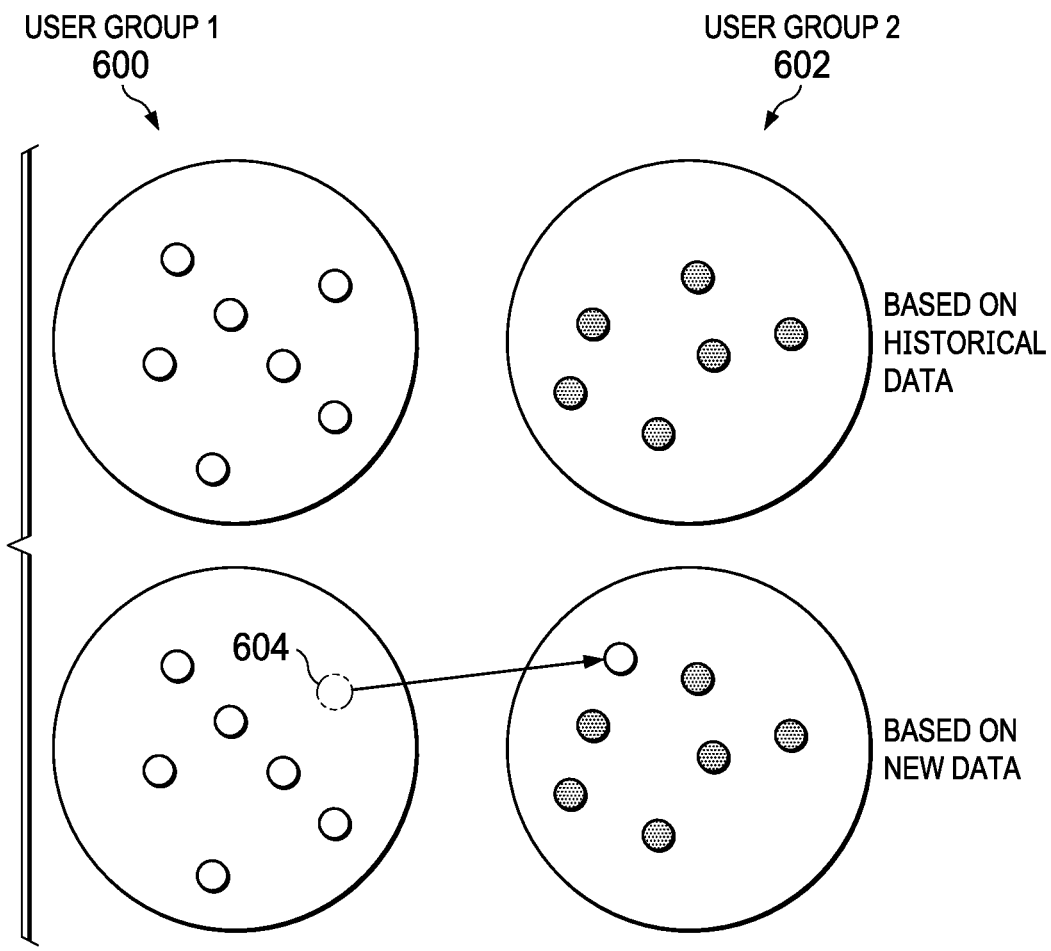
FIG. 6 depicts a basic operation of the user behavior analytics technique of this disclosure by which the system detects if a user's behavior deviates from a defined LDAP group.

To this end, FIG. 6 depicts the basic operating principle of the behavior analysis and modeling technique of this disclosure. As depicted in the top half FIG. 6, and based on historical data, two distinct LDAP groups 600 and 602 have been identified and are depicted as including various members. By way of example, LDAP group 600 represent an engineering group, whereas LDAP group 602 represents a marketing group. More generally, and in this approach, users are grouped, preferably by their user registry attributes, such as job title, department and the like. Typically, members in each defined LDAP group (e.g., groups 600 and 602) are expected to behave in a relatively similar manner with respect to their expected contribution to log activity; conversely, members of different LDAP groups generally behave differently from one another. Thus, and continuing with this example, a relatively larger percentage of members in the engineering group 600 would be expected to access a source code control system or a coding discussion forum as compared to the percentage of users in the marketing group that might undertake such activities. Conversely, a relatively larger percentage of users in the marketing group would be expected to access a sales platform application as compared to the percentage of users from the engineering group that might do so. As will be seen, the technique of this disclosure exploits these differences in access patterns to facilitate a determination regarding user behavior being analyzed. Thus, and as depicted in the bottom portion of FIG. 6, the basic operation of the system detects if the behavior of a user 604 deviates from his or her defined LDAP group. To this end, the system clusters users, preferably using real access pattern data, and then flags the user 604 (from the engineering LDAP group 600) for deviating towards the marketing LDAP group 602. If such deviation is identified, a given action (e.g., issuing an alert) is taken.

There is no limitation on the number of groupings, or their constituents or attributes or other properties. Typically, and as noted above, groupings are based on LDAP attributes, although this is not a limitation either, as any grouping mechanism that identifies grouping(s) based on expected user contributions to log activity may be used.

Figure 7:
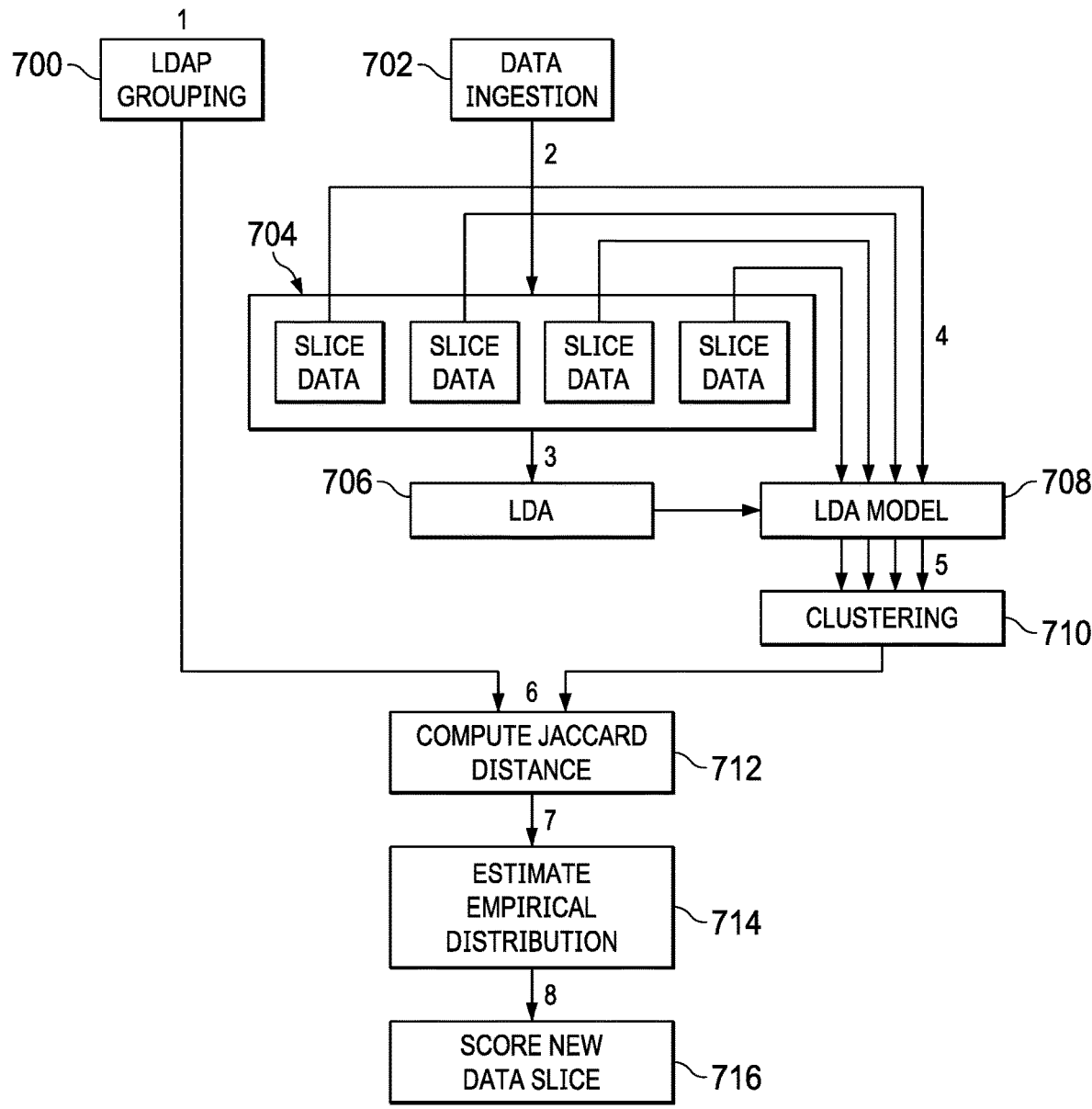
FIG. 7 depicts a preferred machine learning technique used in this disclosure.

FIG. 7 depicts a preferred machine learning (ML) system that is used to support the behavior analytics approach of this disclosure. As will be seen, machine learning preferably occurs in a two (2)-phase manner that is now described in detail.

At step (1), and as described above, users are grouped, preferably using their LDAP properties, into LDAP groupings 700. For example, and using job title and department as example attributes, users in a marketing department with an analyst title are considered to be in the same LDAP group 700. Generalizing, group information is represented using a vector of set $G=(S_1, S_2, \ldots, S_{n-1}, S_n)$ $$\sum_{i=1}^{n} |S_i| = N$$

where a is the number of LDAP groups, $S_i$ is a set of users in LDAP group i, and is a total number of users.

With the LDAP grouping 700 in hand, a training set is then obtained. To this end, and at step (2), preferably low-level category security events are ingested from a log server 702 for these users, e.g., for a past period of T days. A representative value of the variable T is thirty (30) (for the past 30 days), but this is not a limitation, as shorter or longer periods may be used. For each user and each day, there is a set of slice data 704. In this step, user is activities $U_i$ measured on the wide range of low-level categories are then represented as follows:

$$U_i = (C_1^i, C_2^i, \ldots, C_{L-1}^i, C_L^i), i=1,2,\ldots,N$$

$$C_j^i = (C_{j,1}^i, C_{j,2}^i, \ldots, C_{j,t-1}^i, C_{j,t}^i), i=1,2,\ldots,N; j=1,2,\ldots,L$$

where, $C_j^i$ denotes user i's log activity in category j, and L is the total number of low-level categories. In practice, L typically is a relatively large number, e.g., L=2000.

The nature and type of low-level categories will vary depending on implementation. By way of background, a product such as IBM QRadar groups log sources into high-level categories, with each high-level categories comprising a set of low-level categories. Each event is assigned a specific high-level category and a low-level category within that high-level category. A representative high-level category may be "Application," which represents events that are related to application activity, and that high-level category typically includes a large number of low-level categories corresponding to log events that may occur with respect to a user's interaction with one or more applications that correspond to the Application type. In the case of an email application, for example, the low-level categories may include Mail Opened, Mail Closed, Mail Terminated, Mail Denied, Mailed Queued, and so forth. Each low-level category has as description and severity level that is captured in the log. The slice data 704 thus represents a data set of low-level security events derived for each user in the grouping.

Thereafter, and at step (3), a first training phase is initiated. In this phase, a model is built. Preferably, the model is a Latent Dirichlet Allocation (LDA) model 708 that is built on an entire data set $\{U_i\}_{i=1, 2, \ldots, N}$ to infer the activity patterns from all the log events. LDA modeling 706 is a generative statistical modeling technique that allows sets of observations to be explained by unobserved groups that explain why some parts of the data are similar. In LDA, each "document" may be viewed as a mixture of various topics where each document is considered to have a set of topics that are assigned to it via LDA. In the context of the machine learning technique of this disclosure, a "document" represents the low-level log data collected for a particular user of a particular day (the slice data 704 as previously mentioned). Thus, if there are 10 users and 30 days of interest, there are 300 documents.

In LDA, a number of patterns represented in the model is a model parameter, and preferably it is learned through model selection via Akaike Information Criterion (AIC). AIC is an estimator of the relative quality of statistical models for a given set of data. In particular, and given a collection of models for the data, AIC estimates the quality of each model, relative to each of the other models. Thus, AIC provides a means for model selection.

While LDA with AIC model selection is a preferred approach, this is not a limitation. Alternatives to LDA include models that are built, for example, using latent semantic indexing, independent component analysis, probabilistic latent semantic indexing, non-negative matrix factorization, and Gamma-Poisson distribution. An alternative to AIC that may be used is Bayesian Information Criteria (BIC).

According to a preferred approach, the number of patterns preferably is selected from a model that produces a minimum AIC. The result is the LDA model 708 with K patterns, wherein K generally falls in the range of 2 to 20. The process then continues at step (4). At this step, the training data (namely, the users' activities) is transformed, preferably by applying the learned LDA model, to produce the following:

$$U_i = (D_1^i, D_2^i, \ldots, D_{K-1}^i, D_K^i), i=1,2,\ldots,N$$

$$D_j^i = (C_{j,1}^i, C_{j,2}^i, \ldots, C_{j,T-1}^i, C_{j,T}^i), i=1,2,\ldots,N; j=1,2,\ldots,K$$

This operation effectively reduces the dimension of features in the data from L to K. Typically, K is much smaller than L, and typically K ranges from 2 to 20, although this is not a limitation.

The process then continues with training moving to a second phase. In particular, and at step (5), and using the transformed training data, and for each day in $\{1, 2, \ldots, T\}$, the users are clustered into n clusters (typically, the total number of LDAP groups) using a clustering algorithm, for example, a Gaussian Mixture Model. In statistics, a mixture model is a probabilistic model for representing the presence of sub-populations within an overall population, without requiring that an observed data set should identify the sub-population to which an individual observation belongs. Formally, a mixture model corresponds to the mixture distribution that represents the probability distribution of observations in the overall population. The clustering 710 produces an inferred grouping structure as a vector of set $$G'=(S_1',S_2',\ldots,S_{n-1}',S_n').$$

Alternatives to GMM include K-means, X-means, CobWeb, Density-Based Spatial Clustering of Applications with Noise (DBSCAN).

The routine then continues at step (6). At this step, and for each user $i \in \{1, 2, \ldots, N\}$ in each day, the process finds a user's inferred (learned) group in G', (S'∈G'), and the user's LDAP group in G, (S∈G), and then computes a measure of the group difference, preferably using a distance measure (e.g., Jaccard distance 712) computed as follows:

$$D_I(S, S') = \frac{|S \cup S'| - |S \cap S'|}{|S \cup S'|}$$

Other distances measures may be used as well. To provide a concrete example, for a user (user 1), the user's learned group may comprise user 1, user 2, user 3 and user 4, whereas the user's LDAP group, e.g., comprises user 1, user 2, user 4 and user 10.

The process then continues at step (7). At this step, an empirical distribution 714 for the Jaccard distances ($D_J$) is computed across all users and all dates. To this end, a cumulative distribution function (CDF) of the empirical distribution is denoted as:

$$F_{D_j}(d)=P(D_j \leq d),$$

which is the probability that $D_I$ is less than or equal to d. The CDF typically is a large distribution, and it comprises a number of clusters, with each cluster typically comprising a set of user identifiers (e.g., usernames). Clustering preferably is carried out for each user and for each day represented in the modeling period. Each cluster in the CDF represents a learned user group and is based on the network event statistics that are accumulated over the relevant time period (e.g., the last 30 days). This completes the second phase of the machine learning training, and thus the training phase as a whole.

In a representative embodiment, the above-described machine learning is carried out periodically, e.g., every seven (7) days, with the resulting CDF then being used for the next week to alert deviations from normal group behaviors. As noted, preferably thirty (30) days of log event data is used to build and refine the machine learning model. These time periods of course are merely exemplary, as the model (and the resulting CDF) re-computed more or less frequently, and using data sets other than 30 days. Irrespective of the frequency that the ML model is built and the CDF computed, the CDF is then used with respect to new data (e.g., for a given day, or other time period in question) to determine whether a particular user's behavior should be flagged for a deviation.

In particular, and at step (9), and when a new day's data comes in (assuming real-time data is received and analyzed by the system on a daily basis), the new data slice is then scored at 716. To this end, preferably the above-described processing in steps (4)-(6) is repeated to apply the LDA model to transform the data, cluster the users, and for any user, calculate the Jaccard distance between the user's inferred (learned) cluster to the user's actual LDAP group, and denote the distance as d. The user is then flagged (as a user who has deviated from his or her user group) if $F_{D_j}(d) \geq P_t$, where $P_t$ is a threshold, e.g., $P_t=0.99$. This percentage value of course is merely representative and is not intended to limit the technique. In such case, preferably a given action is taken, e.g., an alert is delivered to a user interface. Other response actions include sending a notification, performing a mitigation operation, restricting the user from accessing a resource, or the like. This competes the processing.

Thus, according to this disclosure, users are identified with one or more defined groups (e.g., based on information in the directory) and also potentially with groups that are learned by the machine learning. The defined groups are fixed and determined, for example, by LDAP job title (or some other criteria). Thus, assume there are 10 users, with users [1-5] being engineers, and users [6-10] being assigned to sales-related positions. In the defined group, users 1-5 are in an LDAP group, and users 6-10 are in another LDAP group. As noted above, members of an LDAP group are anticipated to share the same online behavior. When the machine learning evaluates the real online behavior of these individuals, assume user 5 behaves more like a salesperson (than an engineer); this leads to two learned groups being developed by the machine learning, namely, one group that contains users [1-4], and the other group that contains users [5, and 6-10]. Jaccard distances between the defined group and the learned group are used to calculate the cumulative distributed function (CDF) that is then used to facilitate the discrimination and alerting. As noted above, preferably the Jaccard distance history that is used to estimate the CDF is calculated across all users and all dates. In this approach, if there are only a few outliers, the members in the learned group and an LDAP group should almost be the same (but with some difference due to the few outliers). For each user, the approach as described calculates his or her deviation from his or her LDAP group. For an arbitrary user, his or her deviation from his or her LDAP group is measured through the Jaccard distance between the membership (the users) in his or her learned group and the membership in his or her LDAP group. The distance is further evaluated on the CDF plotted over preferably all the historical data. Only when the Jaccard distance is large enough to render it larger than a majority of all historical Jaccard distances (using a configurable threshold, e.g., 99%), an alert for this user is triggered. The high percentile is desirable to reduce false alarms.

In operation, if a particular user is behaving on a given day (or some other time period being evaluated), his or her learned group and LDAP group should coincide (and there should be no alert generated). If, however, the particular user's behavior is sufficiently deviant, his or her learned group and LDAP group typically will differ, and depending on the degree of that difference (given the configurable threshold), an alert is generated.

In this approach, if there are only a few outliers, the members in the learned group and an LDAP group should almost be the same (but with some difference due to the few outliers). For each user, the approach as described calculates his or her deviation The approach as described above provides significant advantages. The technique enables robust detection of user behavior abnormalities and, in particular, based on the notion of detecting deviation from defined groups. The approach is fine-grained as it groups the users according to a preferably two-stage machine learning system. Preferably, registry information from a directory system is used to provide the number of clusters and the basis for comparison. The system learns by carrying out clustering on data slices derived from network event data. The technique is fine-grained as it provides for user grouping preferably using latent allocation and a Gaussian mixture model. The technique is readily implemented, e.g., as an application in a SIEM platform, although it may also be provided as a standalone application. As has been described, the approach herein leverages data ingested from the SIEM for low-level security event categories to provide a baseline (defined) clustering, preferably using users' directory (e.g., LDAP)) properties to facilitate the machine learning system, and then computes statistical deviations from the defined grouping(s) with preferably real-time data; behavior abnormalities are then output, e.g., in a graphic user interface (GUI), to an interested user. As one of ordinary skill will recognize, the technique leverages an unsupervised learning system and thus does not need labeled data.

More generally, the technique herein provides for an enhanced user behavior analytics system that can detect insider threats, helping security analysts detect anomalous or malicious behaviors that occur on the network.

This subject matter may be implemented as-a-service. The subject matter may be implemented within or in association with a data center that provides cloud-based computing, data storage or related services. The machine learning (ML) functionality may be provided as a standalone function, or it may leverage functionality from other ML-based products and services.

In a typical use case, a SIEM or other security system has associated therewith a user interface that can be used to render the alert visually, to search and retrieve relevant information from alert database, and to perform other known input and output functions with respect thereto.

As noted above, the approach herein is designed to be implemented in an automated manner within or in association with a security system, such as a SIEM.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., security incident and event management (SIEM) systems, other security systems, as well as improvements to automation-based cybersecurity analytics.

Having described the invention, what we claim is as follows:

The invention claimed is:

1. A method for detecting user behavior deviation in an enterprise network, comprising:
   defining a set of user groups based on user attribute information received from a user directory of the enterprise;
   receiving from an application security events for a collection of users whose user attribute information is used to define the set of user groups, and generating a set of training data;
   training a machine learning system using the set of training data set to generate a set of clusters in a model of user behavior by: (i) transforming the set of training data to generate transformed training data, (ii) applying a clustering model to the transformed training data to derive a set of learned groupings, and (iii) computing measures of distance between the set of learned groupings and the set of user groups, wherein a cluster is a learned user group that corresponds to a defined user group in the set of user groups; and
   comparing a behavior of a user against the model to detect a deviation from an expected behavior for the user as represented by one of the clusters.

2. The method as described in claim 1 wherein the application is a security information and event monitoring (SIEM) application.

3. The method as described in claim 2 wherein the security events comprise low-level security events ingested from the SIEM.

4. The method as described in claim 1 wherein
   the set of training data is transformed according to a latent allocation model;
   and
   wherein the measures of distance are computed to generate a probability distribution function.

5. The method as described in claim 4 wherein the clustering model is a Gaussian mixture model and comparing the behavior of the user includes:
   receiving new data representing security events associated with a set of users that include the user;
   re-applying the latent allocation model and the Gaussian mixture model to the new data;
   for the user, computing a measure of distance between a learned grouping that includes the user and the user group associated with the user; and
   determining whether the measure of distance computed for the user exceeds a given probability threshold.

6. The method as described in claim 5 wherein the measure of distance computed for the new user is a Jaccard distance.

7. An apparatus, comprising:
   a processor;
   computer memory holding computer program instructions executed by the processor to detect user behavior deviation in an enterprise network, the computer program instructions configured to:
      define a set of user groups based on user attribute information received from a user directory of the enterprise;
      receive from an application security events for a collection of users whose user attribute information is used to define the set of user groups, and generate a set of training data;
      train a machine learning system using the set of training data set to generate a set of clusters in a model of user behavior by: (i) transforming the set of training data to generate transformed training data, (ii) applying a clustering model to the transformed training data to derive a set of learned groupings, and (iii) computing measures of distance between the set of learned groupings and the set of user groups, wherein a cluster is a learned user group that corresponds to a defined user group in the set of user groups; and
      compare a behavior of a user against the model to detect a deviation from an expected behavior for the user as represented by one of the clusters.

8. The apparatus as described in claim 7 wherein the application is a security information and event monitoring (SIEM) application.

9. The apparatus as described in claim 8 wherein the security events comprise low-level security events ingested from the SIEM.

10. The apparatus as described in claim 7 wherein
    the set of training data is transformed according to a latent allocation model;
    and
    wherein the measures of distance are computed to generate a probability distribution function.

11. The apparatus as described in claim 10 wherein the clustering model is a Gaussian mixture model and the computer program instructions to compare the behavior of the user includes computer program instructions further configured to:
    receive new data representing security events associated with a set of users that include the user;
    re-apply the latent allocation model and the Gaussian mixture model to the new data;
    for the user, compute a measure of distance between a learned grouping that includes the user and the user group associated with the user; and
    determine whether the measure of distance computed for the user exceeds a given probability threshold.

12. The apparatus as described in claim 11 wherein the measure of distance computed for the new user is a Jaccard distance.

13. A computer program product in a non-transitory computer readable medium for use in a data processing system to detect user behavior deviation in an enterprise network, the computer program product holding computer program instructions that, when executed by the data processing system, are configured to:
- define a set of user groups based on user attribute information received from a user directory of the enterprise;
- receive from an application security events for a collection of users whose user attribute information is used to define the set of user groups, and generate a set of training data;
- train a machine learning system using the set of training data set to generate a set of clusters in a model of user behavior by: (i) transforming the set of training data to generate transformed training data, (ii) applying a clustering model to the transformed training data to derive a set of learned groupings, and (iii) computing measures of distance between the set of learned groupings and the set of user groups, wherein a cluster is a learned user group that corresponds to a defined user group in the set of user groups; and
- compare a behavior of a user against the model to detect a deviation from an expected behavior for the user as represented by one of the clusters.

14. The computer program product as described in claim 13 wherein the application is a security information and event monitoring (SIEM) application.

15. The computer program product as described in claim 14 wherein the security events comprise low-level security events ingested from the SIEM.

16. The computer program product as described in claim 13 wherein
- the set of training data is transformed according to a latent allocation model;
and
- wherein the measures of distance are computed to generate a probability distribution function.

17. The computer program product as described in claim 16 wherein the clustering model is a Gaussian mixture model and the computer program instructions to compare the behavior of the user includes computer program instructions further configured to:
- receive new data representing security events associated with a set of users that include the user;
- re-apply the latent allocation model and the Gaussian mixture model to the new data;
- for the user, compute a measure of distance between a learned grouping that includes the user and the user group associated with the user; and
- determine whether the measure of distance computed for the user exceeds a given probability threshold.

18. The computer program product as described in claim 17 wherein the measure of distance computed for the new user is a Jaccard distance.

* * * * *